United States Patent [19]

Lippmann et al.

[11] Patent Number: 5,752,409
[45] Date of Patent: *May 19, 1998

[54] METHOD OF ACCURATELY GAUGING FUEL IN AN AUTOMOTIVE TANK

[75] Inventors: Raymond Lippmann, Ann Arbor; Michael John Schnars, Clarkston; James Edward Nelson, North Branch; Ivan Roy Brouwer, Swartz Creek, all of Mich.

[73] Assignee: Delco Electronics Corporaiton, Kokomo, Ind.

[*] Notice: The portion of the term of this patent subsequent to Jan. 23, 2013, has been disclaimed.

[21] Appl. No.: 348,392

[22] Filed: Dec. 2, 1994

[51] Int. Cl.$^6$ ............................................. G01F 23/00
[52] U.S. Cl. ............................ 73/290 R; 73/1.73; 73/1.31
[58] Field of Search ............................. 73/1 H, 1 J, 113, 73/290 R, 305, 306, 312, 314, 1.73, 1.31; 364/571.01, 564

[56] References Cited

U.S. PATENT DOCUMENTS

| | | | |
|---|---|---|---|
| 4,176,553 | 12/1979 | Wood | 73/304 |
| 4,250,750 | 2/1981 | Martinec et al. | 73/308 |
| 4,402,048 | 8/1983 | Tsuchida et al. | 73/113 X |
| 4,625,284 | 11/1986 | Suzuki | 364/509 |
| 4,890,491 | 1/1990 | Vetter et al. | 73/113 X |
| 5,301,113 | 4/1994 | To et al. | 73/113 X |
| 5,381,074 | 1/1995 | Rudzewicz et al. | 315/77 |
| 5,485,740 | 1/1996 | Lippmann et al. | 73/1 J |

*Primary Examiner*—Elizabeth L. Dougherty
*Attorney, Agent, or Firm*—Jimmy L. Funke

[57] ABSTRACT

The maximum full level is determined in a fuel tank of undetermined size using a fuel level sender referenced to the tank bottom. A minimum full value is selected for a given type of tank and when the sender signal goes below a percentage of that value and subsequently goes above the minimum full value, a fueling event is recognized and the current fuel sender value is adopted as the maximum full value. Where a heavily filtered signal is used to minimize the effects of fuel slosh, the maximum full value is subject to increasing to higher values occurring during a short period after fueling to allow recovery of the filtered signal. An empty value is calibrated before the vehicle is initially fueled. A maximum empty level is initially set and if a lower level is measured when the ignition is turned on, the lower level is set as the empty value. This calibration is terminated when the tank is fueled above the minimum full value.

7 Claims, 2 Drawing Sheets

METHOD OF ACCURATELY GAUGING FUEL IN AN AUTOMOTIVE TANK

FIELD OF THE INVENTION

This invention relates to automotive fuel level indication and particularly to a method of accurately gauging fuel in a tank of undetermined size.

BACKGROUND OF THE INVENTION

In most vehicles, fuel level is measured by means of a float attached to the end of a pivot arm. The arm is connected to the wiper of a variable resistor or potentiometer which provides an electrical signal to operate a display. Typically, one end of the variable resistor is connected to ground. The position of the float is determined by the fuel level in the tank. The wiper is either directly connected to an air core gauge, a bi-metal gauge, or to an electronic circuit which indirectly feeds the display means. In newer vehicles, baffles in tanks used to subdue fuel slosh have been substantially removed to lower costs and to allow for inexpensive plastic tanks to replace metal ones. Without baffles, fuel sloshes more in response to vehicle maneuvers which makes accurate estimation of fuel level difficult and calls for electronic circuits to interpret sensor data.

The dimensions of tanks vary from vehicle to vehicle. Plastic tanks are particularly dimensionally unstable and the height of a tank in a given vehicle may change substantially over time and change with temperature as well. Many types of older fuel level sensor assemblies were mounted to the top of the tank causing the float position to also be mechanically referenced to the top of the tank. Variations in tank dimensions both within a given vehicle and from vehicle to vehicle leads to uncertainty of the float position relative to the bottom of the tank. In this situation, the amount of fuel remaining at low levels is not easy to determine accurately. The low fuel condition, however, is important to the driver for obvious reasons. In many cases to correct for low fuel inaccuracies, fuel float assemblies have been redesigned to provide a bottom referenced system. While fuel float assemblies are still mounted to the top of the tank, the float/pivot/sensor portions of the assemblies have been spring-biased against the bottom of the tanks to insure they remain in firm contact with tank bottoms even as the height of the tank varies throughout the life of the vehicle. Of course, in this situation, the amount of fuel in a full tank cannot be accurately determined. Once filled with gas, a vehicle with a bottom referenced sender could in some circumstances be driven for considerable distances before the fuel gauge registered any lowering in the fuel level. It is preferred, however, that accurate fuel levels be reported for all conditions, not only for low fuel.

SUMMARY OF THE INVENTION

It is therefore an object of the invention to indicate fuel level accurately for all conditions. Another object is to automatically compensate for variations in fuel tank sizes and variations in size over time.

The invention is carried out by physically referencing the fuel sensor apparatus to the bottom of the fuel tank, and learning the full level by analyzing changes in the sender signal, particularly changes which indicate that fuel has been added to the tank and exceeds a nominal "full" level. The nominal full level is one which is lower than the maximum level for even the smallest tanks of a given type, so that the difference between he nominal full level and the actual maximum level may vary substantially. The proposed methodology looks for a sender value which is some percentage, say 80%, of the nominal fill level and a following value which is greater than the nominal full level, thereby indicating the addition of fuel; the sender value at that point s scored in memory as the Full level. This value is updated if a greater Full level is received. The Full value is then used along with current sender value and a transfer function to calculate the accurate fuel level indication. The transfer function takes into account the shape of the fuel tank and any sender nonlinearity to yield the fuel level. This calculated level is used to drive an indicator such as an air core gauge or a digital display. In addition, since the method used in this calculation yields accurate measurements, it is useful in algorithms for detecting leaks in fuel tanks.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Since the location of the top of an automotive fuel tank varies from one tank to another in an unpredictable way, as measured using the bottom of the tank for a reference, there is no direct fixed mapping between the float position and the full and empty grads on cluster graphics. However, the total span of a given tank can be estimated if there is some fairly reliable way of determining when a tank is full by reading the sender resistor value at that time. This sender value is the full calibration data point. Since the sender value is fixed and stable for the empty tank condition, the difference between the two sender values is the maximum full to empty sender range for the vehicle at that point in time. The full sender value may be stored in non-volatile memory to retain the data while the vehicle is not powered.

Figure 1:
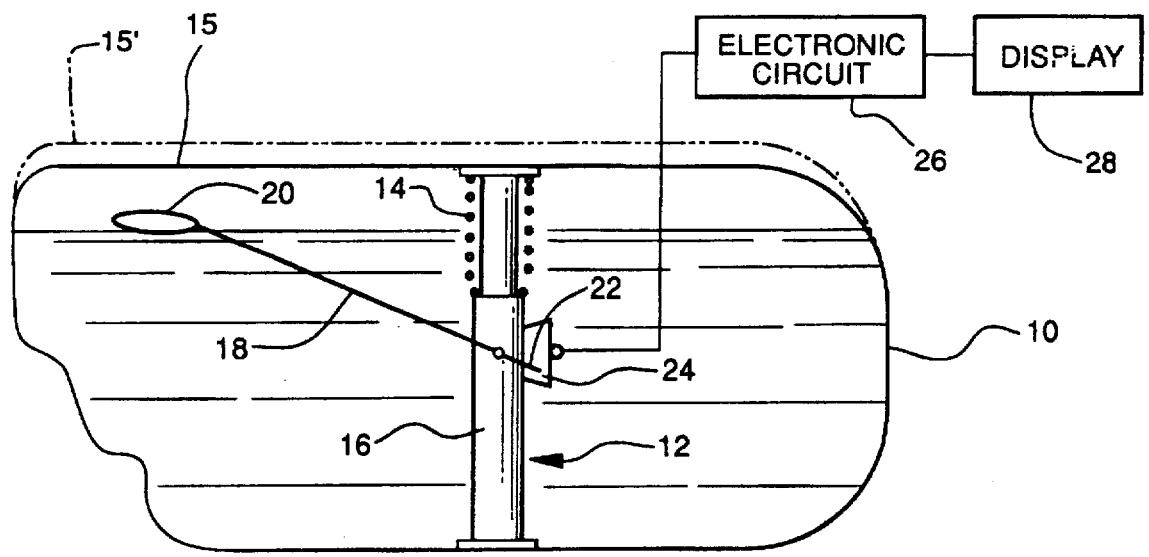
FIG. 1 is a cross section of a fuel tank with a fuel level sender and associated indication circuitry.

Referring to FIG. 1, an automotive fuel tank 10 includes a fuel level sender assembly 12 mounted to the top 15 of the tank. Broken lines 15' indicate an alternate position of the top of the tank to suggest a variation of tank shape over time or a variation from one vehicle to another. The sender assembly is a modified form of a prior art assembly having a mechanical stop which limits the upward motion of the float and prevents the variable resistor or potentiometer from registering above a specified value. By omitting the upper mechanical stop on the float arm and increasing the travel and the range of the variable resistor or potentiometer, continuously varying analog fuel sender data may be obtained up to the point that the float bumps up against the top of the tank. The sender has an upper section 14, and a lower section 16 telescoping with the upper section 14 and spring biased toward the bottom of the tank. The lower section carries a pivot arm 18 having a float 20 on its free end and a wiper 22 near the pivot point for controlling a potentiometer 24. The float position varies with the level of the fuel surface to control the potentiometer. The electrical output is coupled to an electronic circuit 26 which, in turn, drives a display 28. The display may be an electronic digital display or a mechanical indicator such as an air core gauge.

In accord with common practice the electronic circuit compensates for fuel slosh during maneuvering of the vehicle by heavily filtering the raw sender signal from the potentiometer, so that response to any abrupt change of the float level is delayed for a time, and there is little or no response to transient float movements. The electronic circuit 26 processes the filtered sender signal to provide an output to drive the display 28. The circuit preferably includes a microprocessor programmed to carry out the proposed method of determining the signal value for the full or maximum fuel level as well as for empty, and then determining the amount of fuel in the tank for any sender signal. Due to nonuniform shapes of many fuel tanks, the amount of fuel generally is not a linear function of the fuel level. Moreover, due to the sender geometry, the potentiometer signal is not necessarily a linear function of the float level. However, for any given style of tank using a given sender, there is a transfer function, determined empirically, which yields an accurate fuel amount displayed for any sender signal. The transfer function depends on first determining the empty and full sender values. The sender signal for the empty value is determined empirically. Then the fuel contents for any sender value is determined by fitting the transfer function to the empty and full sender values as end points.

Figure 2:
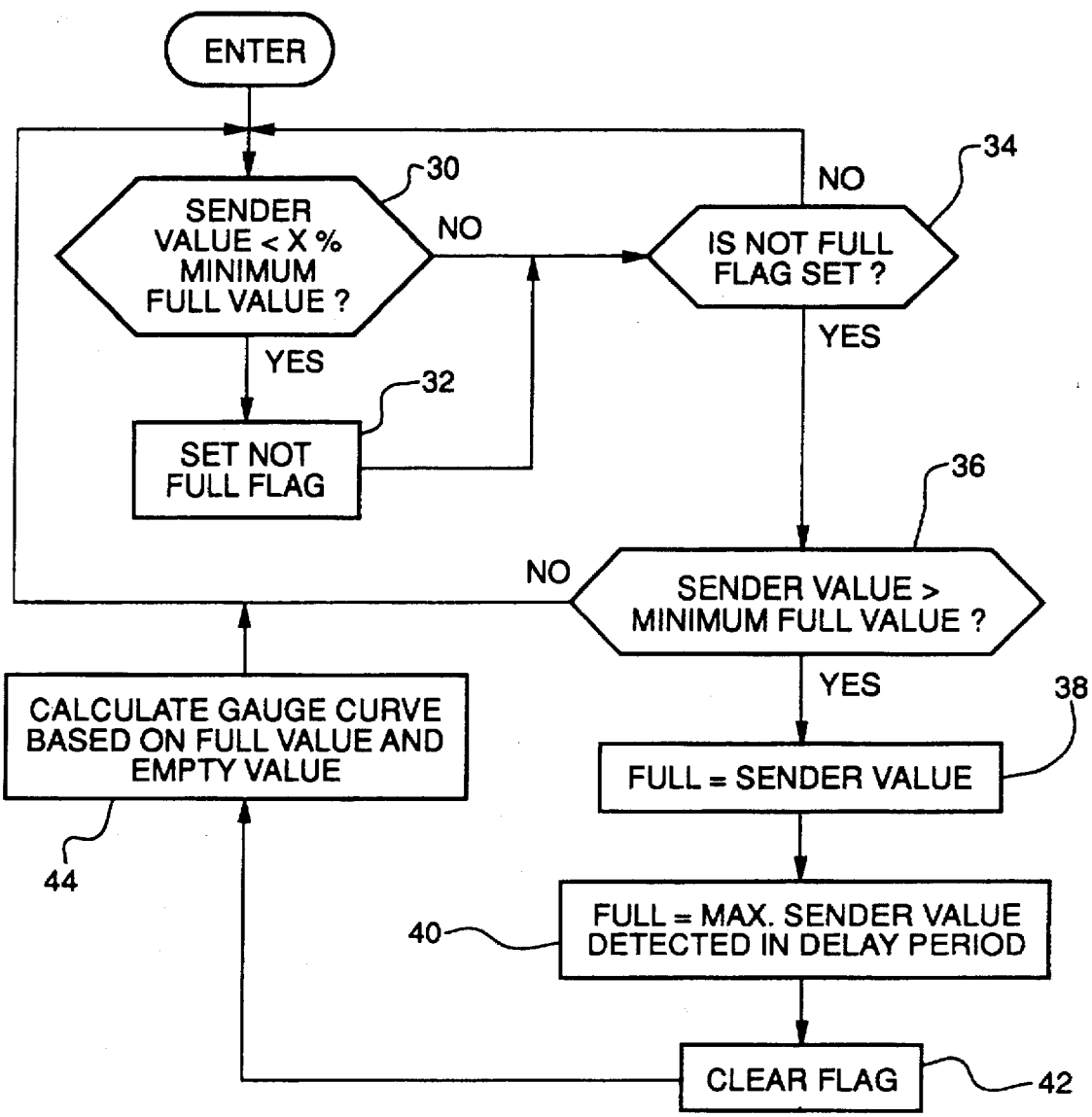
FIG. 2 is a flow chart indicating the method of accurately determining the fuel level according to the invention.

FIG. 2 is a flow chart showing a method of determining the Full value or top of tank level by analyzing the recent history of the filtered sender data, called sender value. It uses a value called "Minimum Full Value" which is nearly full for any tank of a given nominal size, and is chosen as slightly less than the sender value for the smallest expected tank size. Thus if the tank size ranges from 13 to 15 gallons, the Minimum Full Value might be 12.5 gallons. After entering the program, it is determined at step 30 whether the fuel level is less than a certain percentage of the Minimum Full Value. The percentage may be, for example, 80%. This assures that he tank is not full. If it is below that value, step 32 sets a "Not Full" flag. In either case step 34 tests for the flag. If it is not present, step 30 is repeated, using the most recent sender signal data. If the flag is present, and the fuel level is greater than the minimum fuel value (step 36), fueling is deemed to have occurred and the current sender value is saved as the "Full" value in step 38. Thereafter, for a short time period, step 40 replaces the Full value with any larger measured sender value, thereby allowing for a time delay of sender value response to fueling caused by signal filtering. After that time period the program goes to step 42 where the flag is cleared. Finally, in step 44, the gauge curve or transfer function is recalculated based on the Full value and an Empty value.

The system is calibrated for the sender voltage occurring for an empty tank by measuring the Empty value when the vehicle is first manufactured and before the tank is fueled. The microprocessor is initialized with a Maximum Empty Level value which is a relatively small value but is larger than any expected Empty value, and the Empty value is provisionally set at the same value as a default. Thus the Maximum Empty value is small enough for the system to be operational if the actual Empty value is not measured. In addition, the Maximum Empty value is smaller than the amount of fuel initially installed at the factory to drive the vehicle off the assembly line, thereby avoiding the acceptance of that fuel level as the Empty value. For example, if it is the practice to furnish the vehicles with one or two gallons of fuel, the Maximum Empty value would be set in the region corresponding to one-half gallon, and a lower value would be expected to be measured for the Empty value.

Figure 3:
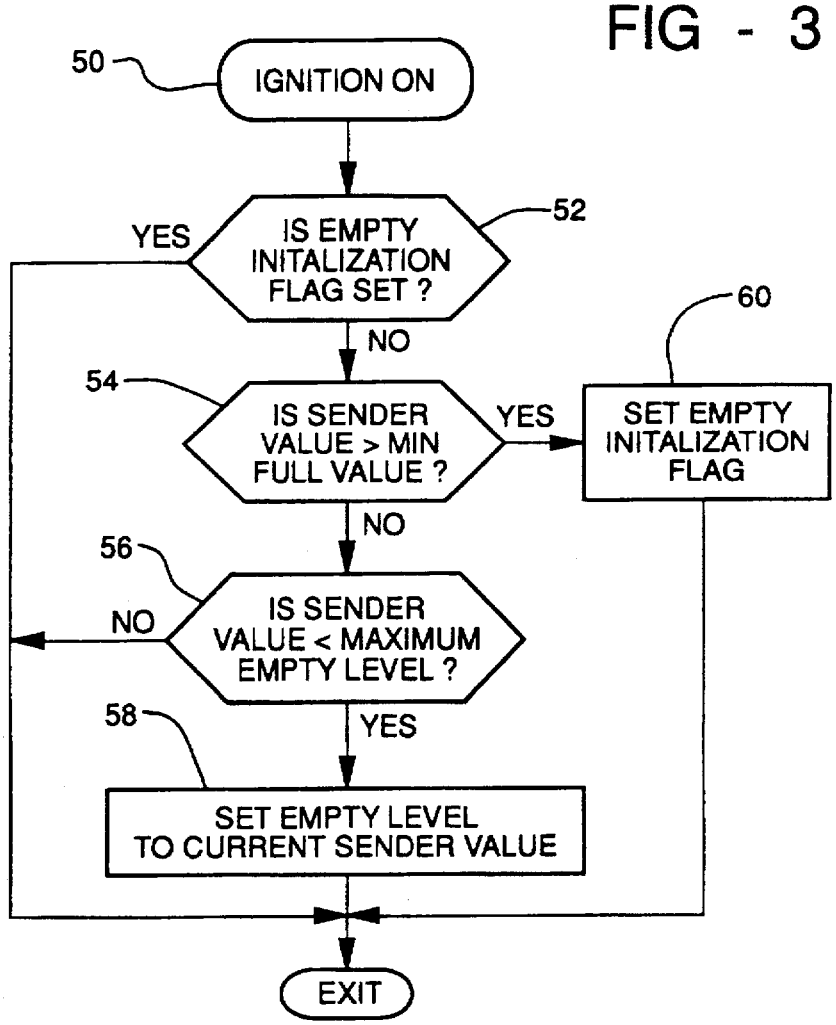
FIG. 3 is a flow chart indicating a method of determining a sender value for an empty tank.

As indicated in FIG. 3, when the ignition is turned on (step 50), an Empty Initialization Flag is checked (step 52). Initially the Flag will not be set. Then (step 54) the sender value is compared with the Minimum Full Value. If it is less and the sender value is also below the Maximum Empty Level (step 56), the Empty value is set equal to the current sender value (step 58) and the program is exited. Each time the ignition is turned on the same procedure occurs until the tank is fueled to a level greater than the Minimum Full Value. The next time the ignition is turned on the step 54 will determine that the sender value is greater than the Minimum Full Value and the Empty Initialization Flag is set (step 60). Thereafter the step 52 will bypass the empty initialization algorithm.

Thus it is evident that the method of determining the maximum full value of a fuel tank requires minimal computation while affording accuracy of fuel level indication at any level. The method determines a full value of a tank in a new vehicle and automatically tracks any changes which occur over time. Due to the recalculation of the transfer function each time a top of tank value is identified, the fuel gauge or other fuel display will show a full tank and will decrease linearly in accordance with fuel usage, thereby avoiding the condition where no change occurs during an initial consumption period.

The embodiments of the invention in which an exclusive property or privilege is claimed are defined as follows:

1. In an automotive fuel level measurement system for a fuel tank of undetermined height having a fuel sender referenced to the bottom of the tank for sensing fuel level comprising the steps of:

obtaining sender values referenced to the bottom of the tank;

determining the full value of the tank from sender values acquired upon filling the tank by analyzing the sender values to recognize a fueling event and to set the sender value following a fueling event as the full value;

storing the full value; and indicating the current fuel level as a function of the current sender value and the full value.

2. The method described in claim 1 wherein the step of analyzing the sender values comprises:

setting a minimum full value for the type of tank in use;

detecting a sender value which is less than a set percentage of the minimum full value;

determining a fueling event by detecting a sender value greater than the minimum full value following detection of a low sender value; and setting the full value equal to the detected sender value greater than the minimum full value.

3. The method described in claim 1 wherein the value is updated when a larger sender value occurs within a prescribed period following a fueling event.

4. The method described in claim 2 wherein for a limited time period after setting the full value, the full value is replaced by a larger sender value when a larger sender value occurs.

5. The method described in claim 1 wherein the step of indicating current fuel level includes the steps of:

establishing a transfer curve related to the shape of the tank: and calculating the fuel level from the transfer curve, the current sensor value and the full value.

6. The method as defined in claim 1 wherein the step of obtaining sender values referenced to the bottom of the tank includes:

calibrating the sender at the time of vehicle manufacture to establish a sender value corresponding to a true empty value.

7. The method as defined in claim 1 wherein the step of obtaining sender values referenced to the bottom of the tank includes calibrating the sender by the steps of:

initially setting a default current empty value slightly above a true empty value; and updating the empty value when a sender value smaller than the current empty value occurs.

* * * * *